(12) United States Patent
Hassan et al.

(10) Patent No.: US 11,636,313 B2
(45) Date of Patent: Apr. 25, 2023

(54) RECOMMENDATION SYSTEM BASED ON NEURAL NETWORK MODELS TO IMPROVE EFFICIENCIES IN INTERACTING WITH E-COMMERCE PLATFORMS

(71) Applicant: SAP SE, Walldorf (DE)

(72) Inventors: Ahmad Hassan, Maidenhead (GB); Muhammad Umair, Heidelberg (DE)

(73) Assignee: SAP SE, Walldorf (DE)

( * ) Notice: Subject to any disclaimer, the term of this patent is extended or adjusted under 35 U.S.C. 154(b) by 670 days.

(21) Appl. No.: 16/701,334

(22) Filed: Dec. 3, 2019

(65) Prior Publication Data
US 2021/0166104 A1   Jun. 3, 2021

(51) Int. Cl.
| | | |
|---|---|---|
| G06N 3/04 | (2023.01) | |
| G06N 3/047 | (2023.01) | |
| G06Q 30/0601 | (2023.01) | |
| G06N 20/00 | (2019.01) | |
| G06N 3/08 | (2023.01) | |
| H04L 67/306 | (2022.01) | |

(52) U.S. Cl.
CPC ............ *G06N 3/047* (2023.01); *G06N 3/08* (2013.01); *G06N 20/00* (2019.01); *G06Q 30/0631* (2013.01); *G06Q 30/0643* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 8,688,732 B1* | 4/2014 | Rajyaguru | G06Q 30/02 |
| | | | 705/26.7 |
| 9,740,438 B2 | 8/2017 | Hassan | |
| 9,804,803 B2 | 10/2017 | Hassan | |
| 9,841,914 B2 | 12/2017 | Hassan | |
| 10,083,183 B2 | 9/2018 | Hassan | |
| 10,248,628 B2 | 4/2019 | Hassan | |
| 10,365,997 B2 | 7/2019 | Hassan | |
| 10,387,127 B2 | 8/2019 | Hassan | |
| 10,437,798 B2 | 10/2019 | Hassan | |
| 10,452,539 B2 | 10/2019 | Hassan | |

(Continued)

OTHER PUBLICATIONS

Xiong et al., "Predicting learning status in MOOCs using LSTM" In Proceedings of the ACM Turing Celebration Conference—China (ACM TURC '19), ACM. May 17, 2019, 5 pages.

(Continued)

*Primary Examiner* — Belix M Ortiz Ditren
(74) *Attorney, Agent, or Firm* — Fish & Richardson P.C.

(57) ABSTRACT

Data for interactions performed by users through a portal page is collected. The data comprising a plurality of sequences of interactions performed by a user on representations of products displayed in the portal page. The plurality of sequences of interactions are input to train a neural network on temporal dependencies between interactions within a sequence from the plurality of sequences. The plurality of sequences are processed by the neural network through a plurality of learning layers to generate a model for product identification. Upon receiving an interaction by a first user at the portal page in relation to a product from the products and based on the model, identifying a first product from the products to be displayed in the portal page for the first user.

18 Claims, 5 Drawing Sheets

(56) References Cited

U.S. PATENT DOCUMENTS

| | | | |
|---|---|---|---|
| 10,474,557 B2 | 11/2019 | Hassan | |
| 11,295,251 B2* | 4/2022 | Chang | G06Q 10/063112 |
| 2004/0103017 A1* | 5/2004 | Reed | G06Q 10/0637 705/14.42 |
| 2018/0024750 A1 | 1/2018 | Hassan | |
| 2018/0024754 A1 | 1/2018 | Hassan | |
| 2018/0024913 A1 | 1/2018 | Hassan | |
| 2018/0024922 A1 | 1/2018 | Hassan | |
| 2018/0024923 A1 | 1/2018 | Hassan | |
| 2018/0024928 A1 | 1/2018 | Hassan | |
| 2018/0025055 A1 | 1/2018 | Hassan | |
| 2018/0025094 A1 | 1/2018 | Hassan | |
| 2018/0307544 A1* | 10/2018 | Chen | G06F 11/3438 |
| 2019/0057015 A1 | 2/2019 | Hassan | |
| 2019/0057131 A1 | 2/2019 | Hassan | |
| 2019/0057151 A1 | 2/2019 | Hassan | |
| 2019/0057213 A1 | 2/2019 | Hassan | |
| 2019/0057332 A1 | 2/2019 | Hassan | |
| 2019/0058761 A1 | 2/2019 | Hassan | |
| 2020/0134695 A1* | 4/2020 | Avlani | G06Q 30/0255 |

OTHER PUBLICATIONS

Wei et al., "A new deep-learning framework for group emotion recognition" In Proceedings of the 19th ACM International Conference on Multimodal Interaction (ICMI '17), ACM. Nov. 3, 2017, 6 pages.

Lin et al. "Short-term prediction of stock market price based on GA optimization LSTM neurons" In Proceedings of the 2018 2nd International Conference on Deep Learning Technologies (ICDLT '18). ACM. Jun. 27, 2018, 5 pages.

Deng et al., "Ad Click Prediction in Sequence with Long Short-Term Memory Networks: an Externality-aware Model" In The 41st International ACM SIGIR Conference on Research & Development in Information Retrieval (SIGIR 18). ACM, Jun. 27, 2018, 4 pages.

* cited by examiner

RECOMMENDATION SYSTEM BASED ON NEURAL NETWORK MODELS TO IMPROVE EFFICIENCIES IN INTERACTING WITH E-COMMERCE PLATFORMS

BACKGROUND

Enterprise platforms and systems provide services and products to end customers. Services and products may be directed to multiple target user groups of the platforms and systems. For example, an e-commerce system offers products in different marketing segments to different user categories to increase sales revenue. Online stores offer collections of products and rely on intelligent marketing for retaining customers and offering products to targeted customer groups. Different content in relation to different products may be provided to different users to increase sales revenue.

Software platforms, such as e-commerce platforms, can require a significant amount of technical resources to support. Example technical resources include computer processors, memory, and communication bandwidth. The manner in which users and the number of users that interact with an e-commerce platform can significantly affect the load on technical resources. For example, during periods of peak usage (e.g., Cyber Monday, Black Friday), the number of users interacting with an e-commerce platform can significantly increase, burdening the technical resources underlying the e-commerce platform, and, in some cases, even requiring additional technical resources to be brought on line. Further, interactions between a user and an e-commerce platform can be inefficient, further burdening the technical resources. For example, the more interactions a user requires with the e-commerce platform to achieve some end (e.g., identify and purchase an item), the more technical resources are expended.

SUMMARY

Implementations of the present disclosure are directed to improving efficiencies in user interactions with e-commerce platforms based on providing product recommendations. According to implementations of the present disclosure, the product identifications and/or recommendations are based on a neural network model trained based on collected user interaction data through a portal page. More particularly, implementations of the present disclosure are directed to collecting data for interactions on products displayed at a user interface of a portal page and inputting the collected data for training a neural network on temporal dependencies between interactions within a sequence of certain length.

In some implementations, actions include collecting data for interactions performed by users through a portal page, the data comprising a plurality of sequences of interactions performed by a user on representations of products displayed in the portal page; inputting the plurality of sequences of interactions to train a neural network on temporal dependencies between interactions within a sequence from the plurality of sequences; processing the plurality of sequences by the neural network through a plurality of learning layers to generate a model for product identification; and upon receiving an interaction by a first user at the portal page in relation to a product from the products and based on the model, identifying a first product from the products to be displayed in the portal page for the first user. Other implementations of this aspect include corresponding systems, apparatus, and computer programs, configured to perform the actions of the methods, encoded on computer storage devices.

In some instances, the first product from the products to be displayed in the portal page comprises providing the interaction from the first user for performing machine learning prediction according to the model as provided by the neural network, the interaction comprising a sequence of actions performed in relation to one or more products from the products displayed in the portal page and evaluating the sequence of actions corresponding to the interaction from the first user based on the model to determine the first product.

In some instances, the plurality of sequences of interactions are defined to have a fixed equal length for a number of interactions within a sequence, wherein the number corresponds to a sequence length value defined by the neural network. The interactions within a sequence from the plurality of sequences may correspond to a single user from the users.

In some instances, processing the plurality of sequences by the neural network comprises initializing an embedded layer to map product identifiers of the products from the portal page to product vector data, wherein the product vector data defines a number of products provided through the portal page, a dimension of the product vector data, and a length value of a sequence to be input to the neural network for training and generating the model for product identification; and generating the model for product identification, wherein the model comprises learning units as hidden layers for iteratively processing input comprising sequences from the plurality of sequences.

In some instances, processing the plurality of sequences by the neural network comprises: normalizing output generated from the learning units at an activation layer of the neural network, wherein the normalization is performed in a non-linear fashion to define a sum of output probabilities to amount to a value of 1.

In some instances, the neural network is a recurrent neural network, and a subsequent layer of the model returns an accumulated output from previously processed layers. The neural network comprises a filtering layer that removes input provided for training the neural network according to a configured reduction factor.

In some instances, in response to receiving the interaction by the first user through the portal page, displaying the first product as part of content dynamically presented in the portal page.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
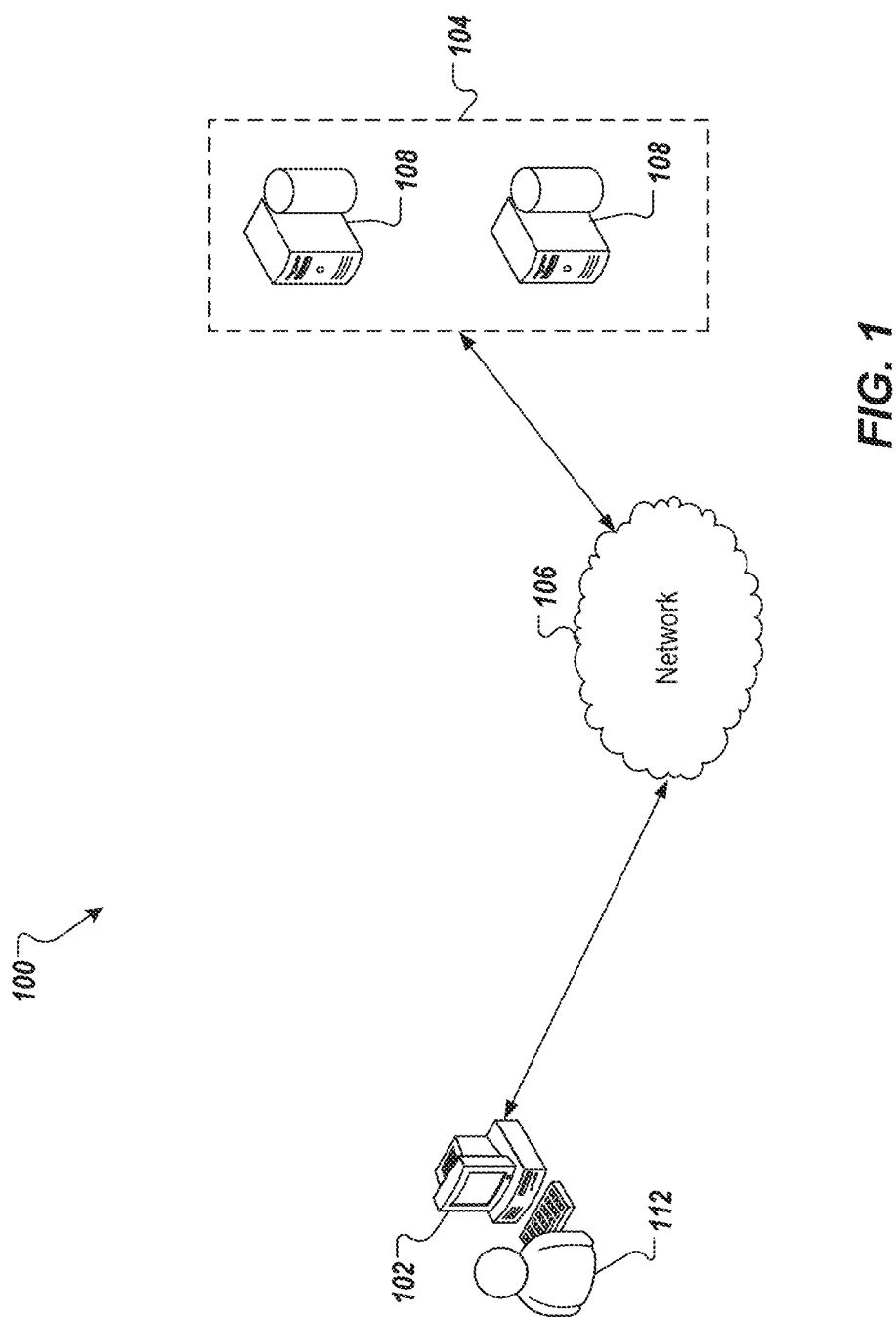
FIG. 1 depicts an example architecture that can be used to execute implementations of the present disclosure.

Implementations of the present disclosure are directed to providing product recommendations based on a neural network model trained based on collected user interaction data through a portal page. More particularly, implementations of the present disclosure are directed to collecting data for interactions on products displayed at a user interface of a portal page and inputting the collected data for training a neural network on temporal dependencies between interactions within a sequence of certain length.

Implementations can include actions of collecting data for interactions performed by users through a portal page, the data comprising a plurality of sequences of interactions performed by a user on representations of products displayed in the portal page; inputting the plurality of sequences of interactions to train a neural network on temporal dependencies between interactions within a sequence from the plurality of sequences; processing the plurality of sequences by the neural network through a plurality of learning layers to generate a model for product identification; and upon receiving an interaction by a first user at the portal page in relation to a product from the products and based on the model, identifying a first product from the products to be displayed in the portal page for the first user.

Providing recommendation for products to customers through an online platform, such as an online store, may result in better positioning of products towards customer's expectations and requirements. Online platforms run different types of applications and services to provide customers with expected results and answer their requests in a timely manner. Providing products within an easier reach, for example, with fewer steps of interaction within a user interface of an online platform may decrease the load of received interactions from users while at the same time improve actual sales transactions executed through the online platform, such as an e-commerce platform. These issues are unique to e-commerce platforms that provided on demand content to multiple users simultaneously and content has to be loaded fast and communication with the platform should be performed efficiently. Purchasing products from a product catalog and selecting a set of products to be loaded at the user interface view for a new customer may improve efficiency of the underlying e-commerce platform.

Implementations of the present disclosure improve efficiency of interaction between human users and e-commerce platforms. If interactions with e-commerce platforms are efficient and do not require numerous loading steps of content and multiple successive processing steps to execute a transaction, the e-commerce platform utilizes the underlying computing resources (e.g., processors, memory) in an improved manner. This can be of particular concern during peak times of higher purchase load, such as events like Cyber Monday, Christmas period, etc. Inefficient use of computing resources also results in slower communication with the e-commerce platform, which may result in delayed presentation of information on the user interface. That can require additional resources to have to be brought online for maintaining a stable performance of the e-commerce platform.

In some instances, a web portal may be configured to communicate with a recommendation system to provide input of received interactions and corresponding executed transactions to train a recommendation system on particular user behavior properties exhibited at the online platform. When a trained model is generated, that trained model may be incorporated into the runtime logic of a web portal, such as an online e-commerce store, to determine and display content at a user interface of the web portal that is selected based on a particular user session of interaction.

Determining content that is presented based on the user who is viewing and interacting with the web portal may decrease load at the underlying system as searching and browsing through product at the web portal may be improved and at the same time may result in more executed purchases. The content may be determined to include products associated with higher probability of relevancy to the user interacting with the web portal.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an application (e.g., provided as one or more computer-executable programs executed by one or more computing devices) that provides services in relation to products to end users. In some instances, the application is a web portal provided as part of an e-commerce platform. Through the web portal, customers may preview and execute purchases of products of different categories and with different properties. Such a web portal may be provided as part of an e-commerce online store for clothes, shoes, computer equipment, etc. The web portal includes a user interface where selection of products offered by the portal may be presented based on user interactions. The user interface may include different tools and interaction controls to navigate between different product categories and select products of certain type and of certain properties. A set of products may be selected to be provided at a display area of a user interface screen currently in view of a user based on analyzing current user interactions based on an intelligent data model for predicting user behavior.

In some instances, the intelligent data model may encode insight on user behavior based on performed neural network training. The model may be based on multiple sequences of interactions, each sequence corresponding to a different user. In this manner, the model is trained on temporal dependencies between interactions within a sequence. A recommendation system may be implemented to include neural network implemented logic to generate such a model and analyze user interaction to provide recommendations for products for display at the web portal.

In some implementations, the web portal and the recommendation system may be hosted at the server system 104 or may be hosted at different systems coupled to communicate and exchange data. The web portal and the recommendation system may interact to determine relevant content including products to be presented to different user based on insight gained from analyzed customer behavior and implemented into a trained neural network model.

Figure 2:
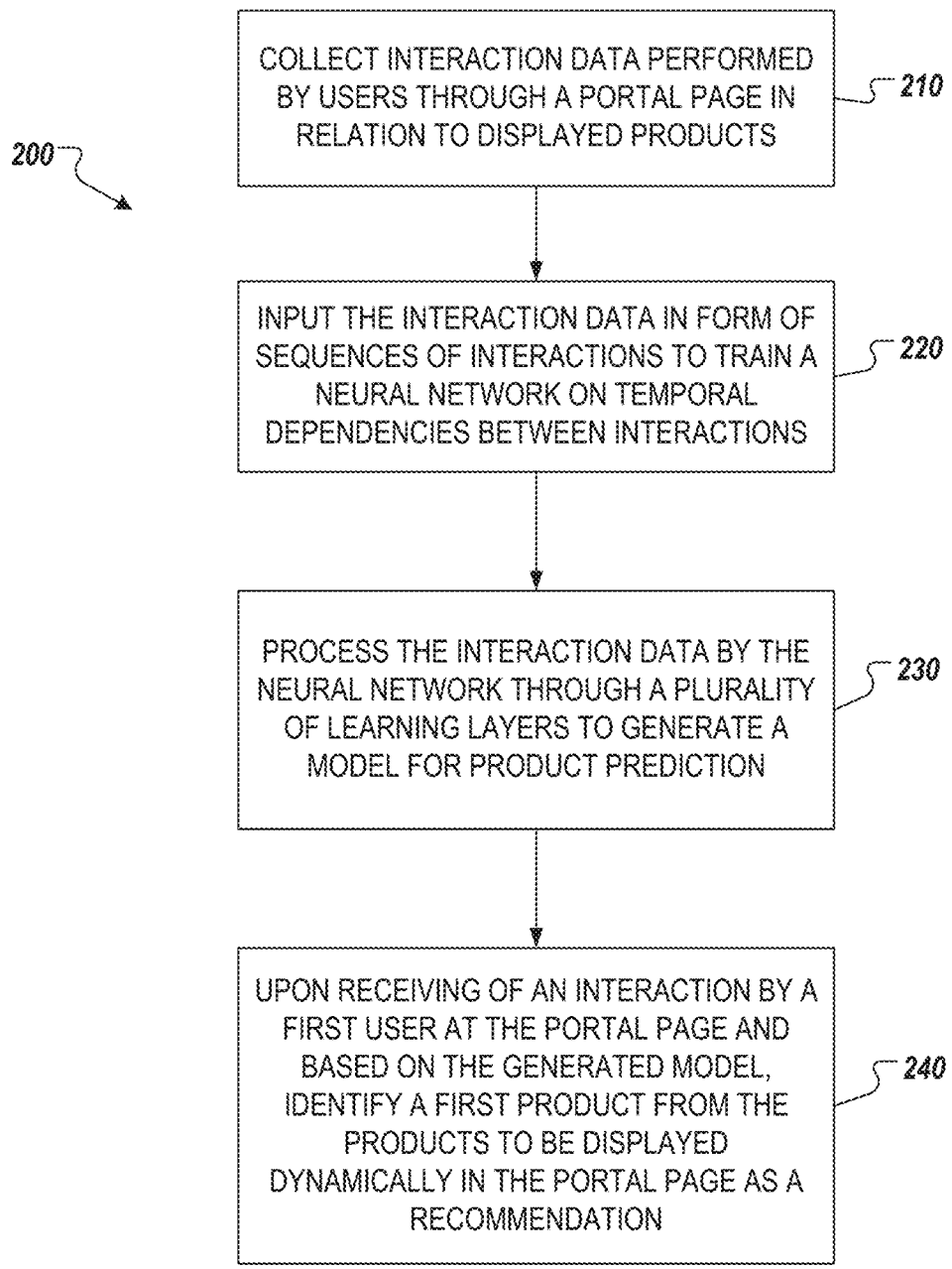
FIG. 2 depicts an example process that can be executed in accordance with implementations of the present disclosure.

FIG. 2 depicts an example process 200 that can be executed in accordance with implementations of the present disclosure. In some examples, the example process 200 is provided using one or more computer-executable programs executed by one or more computing devices.

At 210, data for interactions performed by users through a portal page is collected. The data includes a plurality of sequences of interactions performed by a user on products displayed in the portal page.

At 220, the plurality of sequences of interactions are input to train a neural network. The neural network is trained based on such input on temporal dependencies between interactions within a sequence from the plurality of sequences.

In some instances, the plurality of sequences of interactions are defined to have a fixed length of a number of interactions within a sequence, and to have equal length for the sequence. The length of a sequence from the sequences that are provided for training the neural network may be a predefined sequence length value that is configured by the neural network. In some instances, the length of a sequence may be adjustable and configurable.

In some instances, interactions within a sequence from the plurality of sequences correspond to interactions performed by only one user from the users that may interact with the portal page.

At 230, the plurality of sequences of interactions are processed by the neural network through a plurality of learning layers. A model for product recommendation is generated at the neural network. The model is for identifying a product to be recommended and displayed at the portal page.

In some instances, when the neural network processes the provided plurality of sequences of interactions, the neural network initializes an embedded layer to map product identifiers of the products from the portal page to product vector data. The product vector data defines a number of products provided through the portal page, a dimension of the product vector data, and a length value of a sequence to be input to the neural network for training and generating the model for product recommendation.

The processing of the input data at the neural network includes generating of a model for product recommendation. The model is a neural network model and includes learning units as hidden layers for iteratively processing input provided for processing to the neural network. The input that may be processed through the model includes sequence of actions performed by a user at the portal page in relation to one or more products displayed at the user interface.

In some instances, the neural network model includes multiple layer, where a subsequent layer of the model returns an accumulated output from previously processed layers.

In some instances, the neural network is a recurrent neural network.

At 240, a product from the products associated with the portal page is identified to be displayed in the portal page as a recommendation for a first user. The recommendation for the product is provided upon receiving of an interaction by the first user at the portal page in relation to other products in the portal page. The recommendation is based on the generated model at the neural network based on the performed training.

In some instances, to identify the product for recommendation for the first user, the received interaction at the portal page are provided for performing machine learning prediction according to the generated model as provided by the neural network. The received interactions by the first user comprise a sequence of actions performed in relation to one or more products displayed in the portal page. The number of actions included in the sequence of actions received with the interaction may be different then the length of the sequences input in the neural network for training.

Based on the received interaction by the first user through the portal page and processing the interactions through the neural network model, the determined product for recommendation is displayed at the portal page. The display of that product is performed dynamically and is incorporated in the presented content at the portal page.

Figure 3:
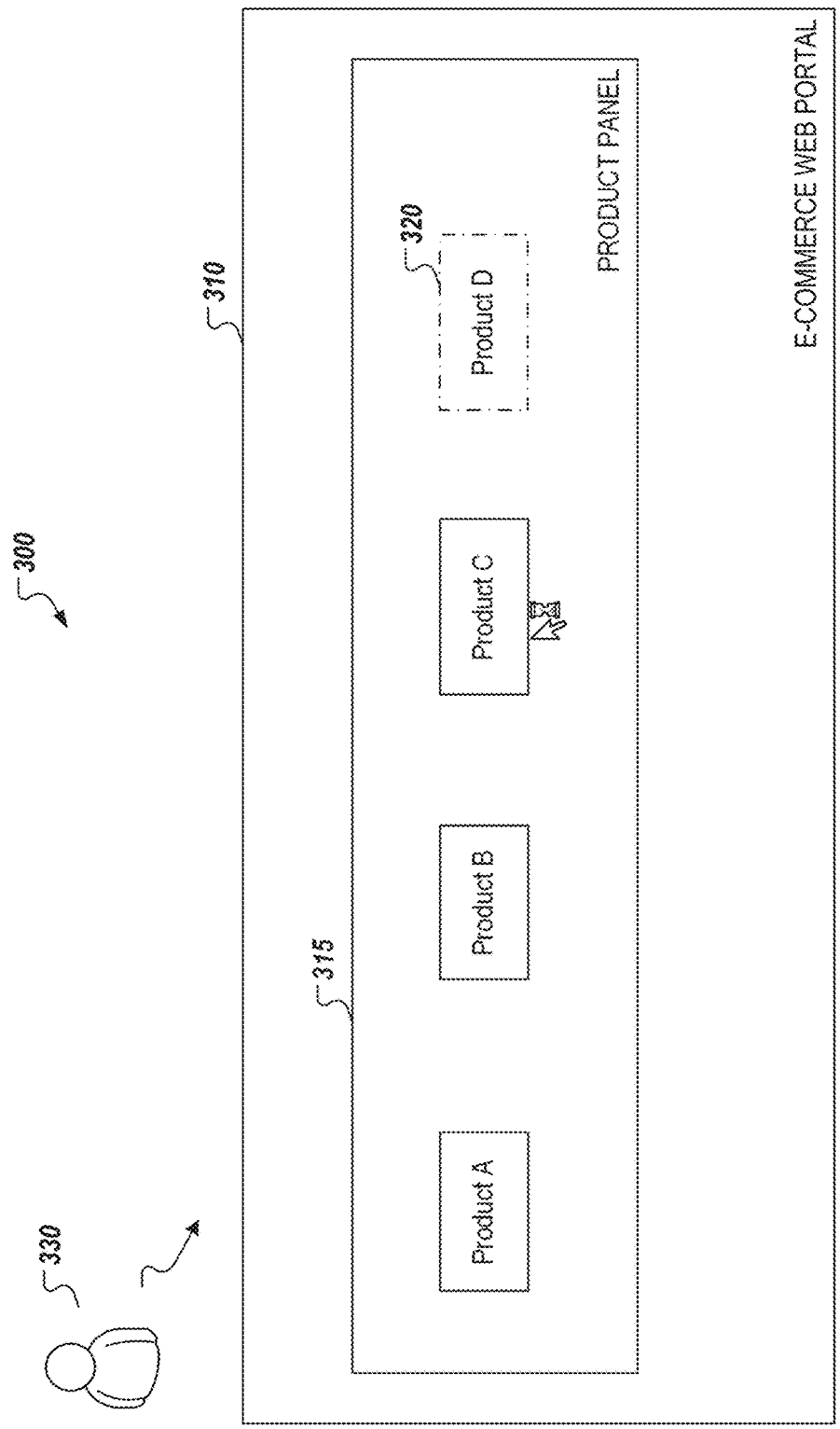
FIG. 3 depicts an example web interface of a web portal displaying product recommendations based on neural network according to implementations of the present disclosure.

FIG. 3 depicts an example web interface 300 of a web portal displaying product recommendations based on neural network according to implementations of the present disclosure. The web portal is an e-commerce web portal 310 that is accessible for end users, such as user 330. The web portal is running on a platform infrastructure and may be communicatively coupled to artificial intelligence logic providing prediction services for customers' behavior based on a trained neural network model. The web portal may be the portal page as previously discussed in relation to FIG. 1 and FIG. 2.

In some instances, the e-commerce web portal 310 may provide input to a neural network. The input is processed based on the intelligent logic implemented at the neural network at multiple learning layers. By processing the input through the multiple layers of the neural network, a recommendation for a product may be determined. The product recommendation is for offering the product to the current user interacting with the e-commerce web portal 310 as a recommendation that is associated with higher probability of resulting at a purchase transaction, e.g., through the e-commerce web portal 310 or through a related system.

In some instances, a product panel 315 is displayed at a user interface of the e-commerce web portal 310. The product panel 315 may present dynamic content as suggested product items to be sold to customers of the e-commerce web portal. The product panel 315 may be presented as a display area section where multiple items may be scrolled by a user to preview the whole content.

In some instances, the product panel 315 may include content that dynamically changes based on user interactions with the e-commerce web portal 310. For example, based on a location determined for a user viewing items on the e-commerce web portal 310, the product panel 315 may display a particular selection of products and incorporate them in the user interface in form of a carousel where content is dynamically moving to change the displayed items. As another example, based on a user viewing three t-shirts in a row of size S, the product panel 315 may include other products such as other t-shirts of size S and a sweater of size S. Determination of which products to be included in the product panel 315 may be performed runtime and may be based on a neural network model generated based on training according to sequences of interactions performed by user. For example, inclusion of products at the product panel 315 may be based on received recommendations from a neural network as discussed in relation to process 200, FIG. 2.

In some instances, the product panel 315 is a recommendation section of a product page, where users are provided with information in form of selectable product items. The product panel 315 includes a selection of related and/or relevant products for a user 330 accessing the product panel view. The user 330 may preview the products defined for the product panel 315. The user may interact with content presented on user interface sections of pages within the e-commerce web portal 310. The user may review products from product categories in the web portal 310 that are outside of the product panel 315.

In some instances, interactions of the user 330 with the e-commerce web portal 310 and products displayed at the e-commerce web portal 310 may be processed by implemented logic at a product recommendation system associated with the e-commerce web portal 310. The processing of the interactions may be based on processing at a neural network, such as the discussed neural network in relation to FIG. 1 and FIG. 2, and also further described below in relation to FIG. 4. The neural network may be trained to include an intelligent model that may process interactions received from user 330 and determine to recommendations for products to be presented on the user interface of the e-commerce web portal 310 for user 330.

When the user 330 interacts with content on the e-commerce web portal 310, the user 330 may be provided with additional content related to recommended products at the product panel 315. The display of the recommended product may be presented to the user 330 dynamically, without having to leave a page of the e-commerce web portal 310 that is currently reviewed and displayed. The recommendations may be displayed at the product panel 315 in a dynamic manner defining a new product as included in a currently displayed portion of the product panel 315. In some case, the recommended products may be included within the content for display at the product panel 315. However, to be presented on the visible portion of the user interface of the e-commerce web portal 310, the user 330 performs a scrolling operation to either direction (left or right) to preview all of the content of the product panel 315. As the content is updated based on the recommendation logic of the neural network received at the web portal 310, by scrolling between the items of the product panel 330 the user may preview different products as suggestions corresponding to his profile and interest.

For example, based on interaction with product A and product X (not presented on FIG. 3 and displayed as a product at a part of the user interface of the e-commerce web portal 310), the e-commerce web portal 310 may display at the product panel 315 an additional product, product D 320 as a recommendation for user 330. The recommendation of product D 320 to user 330 is determined based on the generated neural network model that is trained according to collected data for interactions performed by multiple users through the e-commerce web portal 310. For example, the recommendation may be determined as discussed above in relation to FIG. 2.

In some instances, by implementing a recommendation system in relation to the e-commerce web portal 310, a selection of products provided by the e-commerce web portal may be targeted and presented at the product panel 315 for display to user 330. In such manner, the selection of products may be customized for the particular user 330 and his profile and behavior characteristics. When a different user logs in the e-commerce web portal 310, and start to interact with the web content, based on review of his interaction and/or his user profile characteristics (if such can be identified), a different set of products may be displayed at the product panel 315.

Figure 4:
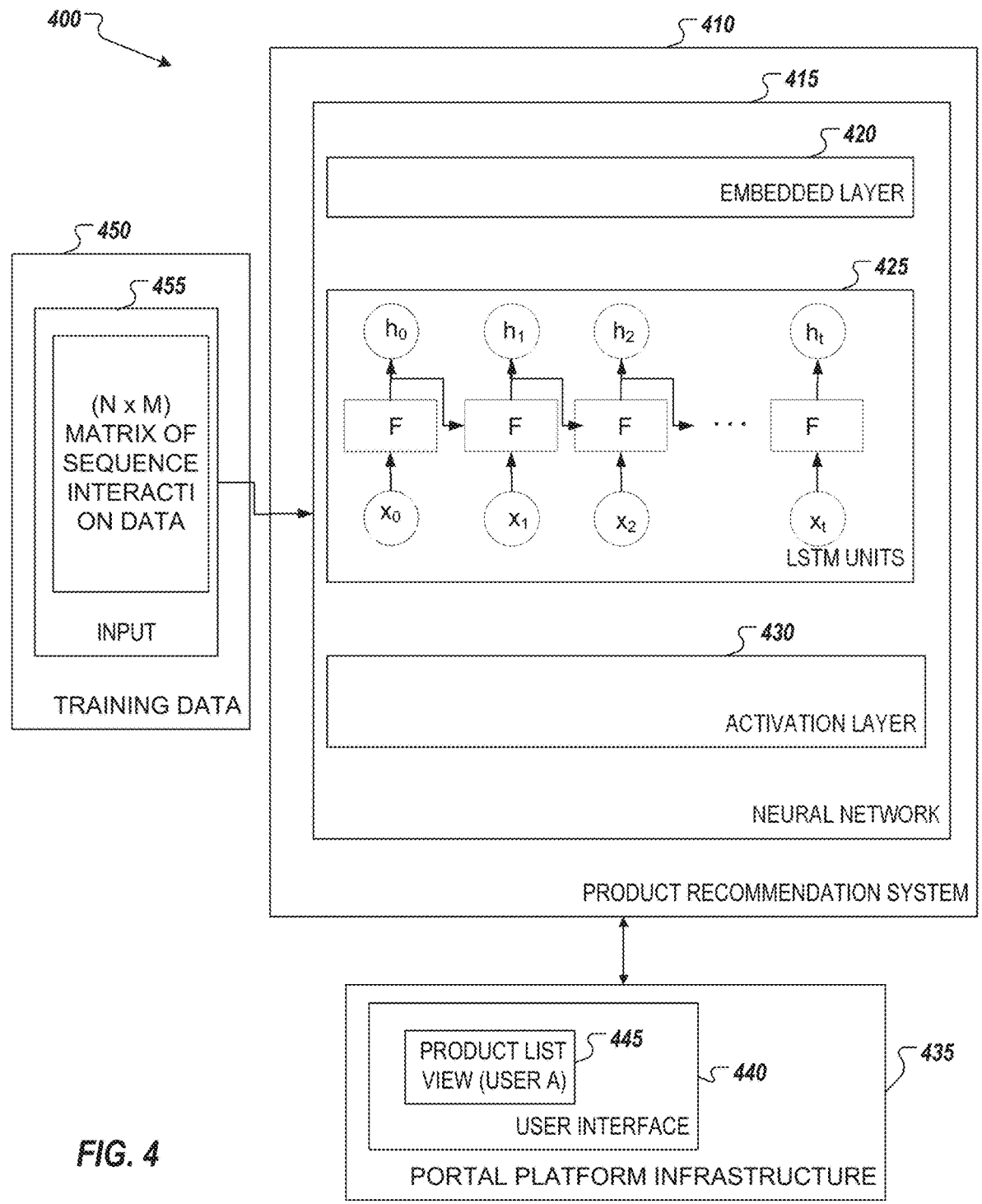
FIG. 4 depicts an example process that can be executed in accordance with implementations of the present disclosure.

FIG. 4 depicts an example system 400 that can be executed in accordance with implementations of the present disclosure. The system 400 includes a portal platform infrastructure 435 where a web portal runs. The web portal 440 provides a user interface for interaction in relation to products. The web portal 440 may be such as the e-commerce web portal 310, FIG. 3, or the portal page discussed in relation to FIGS. 1 and 2. The user interface of the web portal 440 includes different views for different users.

In some instances, the different views include different sets of products that may be associated with user's roles, history, preferences, settings, configuration, etc. For example, a product list 445 may be displayed on the user interface of the web portal 440 to include a product list that is determined for user A. The product list may be determined to include products determined based on implemented recommendation logic at a product recommendation system, such as product recommendation system 410. The product recommendation system 410 may be implemented to perform training of a data model to provide product recommendations based on user interactions.

In some instances, the product recommendation system 410 may be implemented to perform the process as described in relation to FIG. 2. The product recommendation system 410 includes a neural network 415 that is trained based on training data 450 to generate a model for product recommendation.

In some instances, data is collected for interactions performed by users through the web portal 440, and such data is stored as input 455 to be provided for training at a neural network. The input 455 is data collected from interactions performed by users and may be organized in forms of multiple sequences of interactions, where one sequence correspond to one user from the users. The sequences are defined with fixed length and correspond to different types of interaction events performed by a user. For example, a sequence of interactions performed by user A may be five consecutive clicking operations on different products presented on the user interface of the web portal 440. The interactions within a sequence may correspond also to click operations that define purchase transactions, or viewing request, or request for including a product in a purchase bag. The interactions collected for different user may represent customer behavior in purchasing products through a web portal.

In some instances, different users may have different tendency of reviewing products or different variants of a single product (i.e., one or more properties, such as color and size, of a given product, such as a T-shirt). For example, a user A may be reported to have interacted with a given product, such as a T-shirt, in the following order—first viewing a T-shirt of size M, color blue, then viewing a T-shirt of size M, color red, then viewing the same T-shirt as the one with color red, but in size S, and then including that T shirt in color red and size S in a purchase bag, together with a brawn hoody of size M.

In some instances, the input 455 provided to the product recommendation system 410 is in form of a data matrix of size (N×M), where M is the size of a number of interactions collected for a single sequence, and N is the number of multiple sequences that are input to the product recommendation system for the neural network training.

The input 455 is provided to train the neural network on temporal dependencies between interactions within a sequence from the multiple sequences. In some instances the input 455 may be provided in full or just a portion of the collected matrix of multiple sequence of interactions may be input for the neural network training. When the input 455 is provided to the product recommendation system 410, the input is processes through a plurality of learning layers defined at the neural network 415. Based on processing the multiple sequences of interactions at the different layers, a model for product recommendation is generated.

In some instances, when the web portal 440 provides data for interactions performed by a first user at the user interface of the web portal 440, the received interaction data is processed by the generated data. The received interaction data may be related to one or more products provided on one or multiple (different) display screens at the user interface of the web portal 440. Based on the neural network model at the product recommendation system 410, a first product from the products related to the web portal 440 may be determined as relevant for recommendation to the first user. Such a determination of the first product may be interpreted as a product recommendation for display of information in relation to the first product at the web portal 440 as a recommendation to the first user. The first product is recommended to the first user based on the implemented logic at the generated model based on the performed training. The first product may be associated with higher probability of resulting in a purchase transaction at the web portal 440 based on insight from the training data 450. Therefore, products with higher chances of resulting in sales revenue generated through the web portal are provided to the immediate attention of the user, for example at a product panel, such as the product panel 315 at FIG. 3.

In some instances, the provided input 455 for training of the neural network 415 is processed at multiple layers including an embedded layer 420, a long short-term model (LSTM) units layer, and an activation layer 430. Further, the neural network 415 may include additional layers, such as a filtering layer (not presented on FIG. 4).

In some instances, the model generated through the neural network 415 is a sequential model that may be represented as a linear stack of layers. The generated model is built by adding layers, for example, by importing modules by invoking a neural network application programing interface (API), for example, Keras. For example, a sequential model may be created within a Keras LSTM model. As the model is sequential, a shape of a first layer may be specified and the remaining layers can be inferred automatically.

In some instances, the number of sequences provided as input to the neural network 415 is processed by the embedded layer 420. The embedded layer maps product identifiers of the products from the web portal to generate product vector data. The product identifiers correspond to products associated with the interactions defined in a sequence of interactions. The input data is processed in a sequence by sequence manner. A first sequence may be associated with multiple products. Product vector data is generated to define the number of products identified through the interactions, a dimension of the product vector data, and a length value of the sequence.

At the embedded layer, product vectors of specified length are generated and an embedded layer is added to the model. For example, Keras embedding may be implemented to produce such vectors by using the following function (1):

$$\text{Embedding(catalog\_size,desired\_dimenstion\_of\_vector,length\_of\_sequence)} \quad (1)$$

The function (1) converts product identifiers (IDs) (referenced by integers) into meaningful embedding vectors or simply the vectors. The embedded layer may be initialized and added to the model according to invoking function (2):

$$\text{model.add(Embedding(10000,250,3))} \quad (2)$$

In some instances, a model is generated through processing at the LSTM units layer 425. The LSTM units layer comprise learning units as hidden layers for iteratively processing input including the sequences from the input 455. The number of units within the LSTM Units layer 425 may be specified, for example, by invoking following Keras functions (3) and (4):

$$\text{LSTM(hidden\_layer\_size,return\_sequences=True)} \quad (3)$$

$$\text{model.add(LSTM(hidden\_layer\_size, return\_sequences=True))} \quad (4)$$

At function (3), the return_sequences parameter is set to value of True that ensures that LSTM units returns all of the outputs from the unrolled LSTM cell through time. If the return_sequences parameter is set to value of False, then LSTM cell will only return the output of a last step.

In some instances, the output generated from the LSTM units layer 425 may be input into a filtering layer to improve results provided based on the learning model by excluding input randomly from the training process. For example, the filtering layer may be instantiated between the LSTM units layer 425 and the activation layer 430. The filtering layer may be instantiated through invoking a dropout Keras function, such as function (5) below:

$$model.add(Dropout(0.5)) \quad (5)$$

The Dropout layer works by probabilistically removing inputs to a given layer, which may be input variables in a data sample or activations from a previous layer. By utilizing the dropout layer to randomly filter part of the input, the neural network model is generated as a more robust model to respond to received inputs for processing. By applying a dropout layer, bias in customer's behavior towards particular products or preferences may be removed.

The input parameter to formula (5) for the Dropout layer is the probability of setting input to zero. In the formula (5), the probability is set to 50% chance of setting inputs to zero, for example, ignoring half of the input at random occasions.

The neural network also includes the activation layer 430 as part of the model generation. At the activation layer, received data from a previous layer is normalized in a a non-linear manner to define a sum of output probabilities to amount to a value of 1.

In some instances, the activation layer may be a softmax activation layer of Keras to normalize the output. In the softmax layer, the output is normalized in a non-linear fashion so that the sum of output probabilities is equals to 1 according to function (6) below:

$$model.add(Activation('softmax')) \quad (6)$$

The LSTM model cannot determine which is the class of the input received, and therefore calculates probability values for each class and use softmax to normalize it. The output probabilities per class are in the range 0 to 1 and the total sum is 1.

In some instances, based on the generated model at the neural network 415, input provided from the web portal 440 in relation to interactions performed by a current user navigating within the display of products at the user interface of the web portal 440 is evaluated. According to the logic at the neural network model, a recommendation of a product that is with higher probability of a selection that may result in a purchase through the web portal 440 may be provided. The recommendation may be provided in form of a product identifier corresponding to the product determined through the neural network trained model.

Based on received recommendation from the product recommendation system 410, the user interface of the web portal 440 may include in a display area information for the recommended product. For example, the recommended product may be displayed at a product panel such as the product panel 315, FIG. 3.

Figure 5:
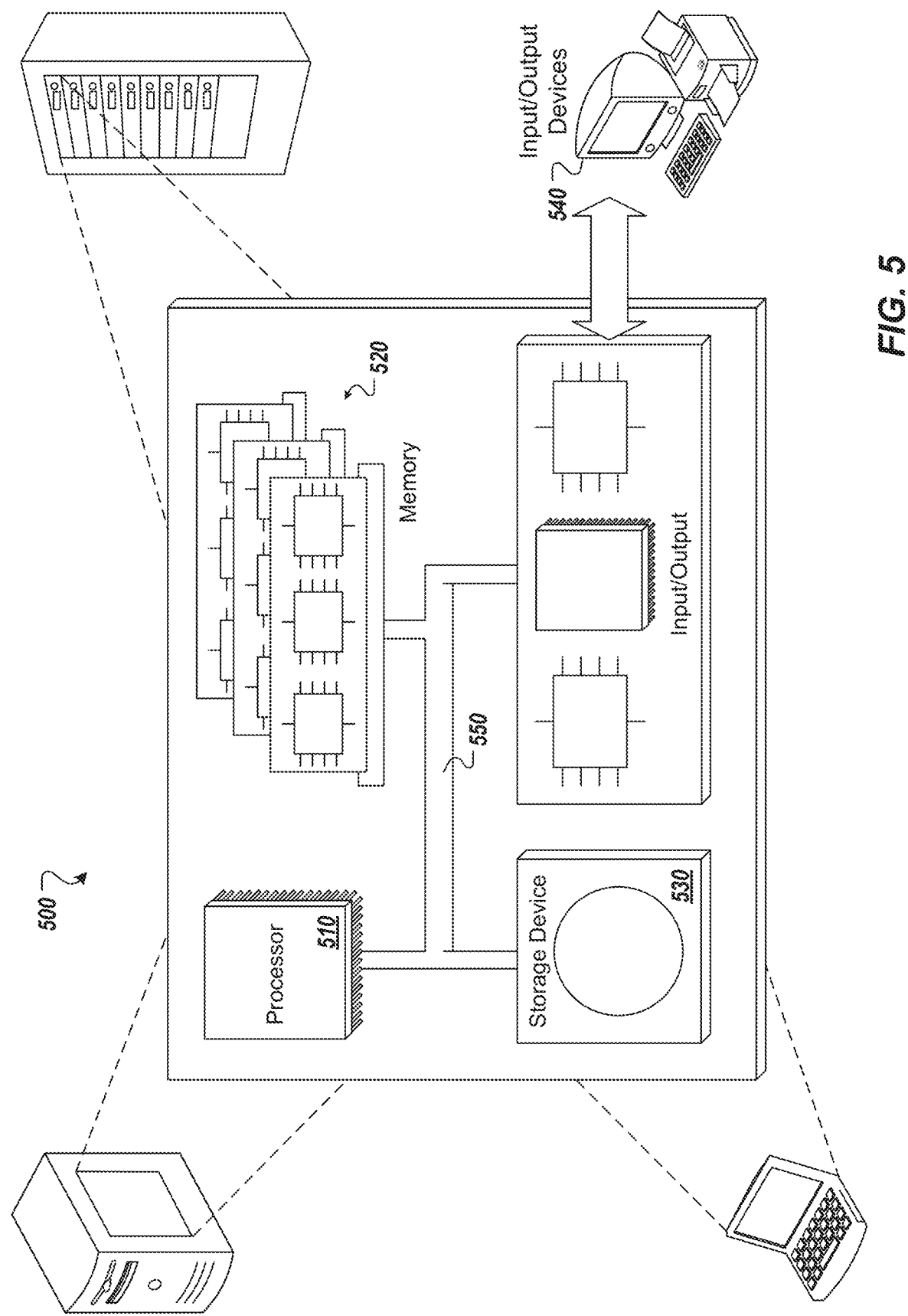
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method, the method being executed by one or more processors and comprising:
collecting data for interactions performed by users through a portal page, the data comprising a plurality of sequences of interactions performed by a user on representations of products displayed in the portal page;
inputting the plurality of sequences of interactions to train a neural network on temporal dependencies between interactions within a sequence from the plurality of sequences;
processing the plurality of sequences by the neural network through a plurality of learning layers to generate a model for product identification, the plurality of sequences of interactions being defined to have a fixed equal length for a number of interactions within a sequence, the number corresponding to a sequence length value defined by the neural network; and
upon receiving an interaction by a first user at the portal page in relation to a product from the products and based on the model, identifying a first product from the products to be displayed in the portal page for the first user.

2. The method of claim 1, wherein identifying the first product from the products to be displayed in the portal page comprises:
providing the interaction from the first user for performing machine learning prediction according to the model as provided by the neural network, the interaction comprising a sequence of actions performed in relation to one or more products from the products displayed in the portal page; and
evaluating the sequence of actions corresponding to the interaction from the first user based on the model to determine the first product.

3. The method of claim 1, wherein interactions within a sequence from the plurality of sequences correspond to a single user from the users.

4. The method of claim 1, wherein processing the plurality of sequences by the neural network comprises:
initializing an embedded layer to map product identifiers of the products from the portal page to product vector data, wherein the product vector data defines a number of products provided through the portal page, a dimension of the product vector data, and a length value of a sequence to be input to the neural network for training and generating the model for product identification; and
generating the model for product identification, wherein the model comprises learning units as hidden layers for iteratively processing input comprising sequences from the plurality of sequences.

5. The method of claim 4, wherein processing the plurality of sequences by the neural network comprises:
normalizing output generated from the learning units at an activation layer of the neural network, wherein the normalization is performed in a non-linear fashion to define a sum of output probabilities to amount to a value of 1.

6. The method of claim 4, wherein the neural network is a recurrent neural network, and a subsequent layer of the model returns an accumulated output from previously processed layers.

7. The method of claim 1, wherein the neural network comprises a filtering layer that removes input provided for training the neural network according to a configured reduction factor.

8. The method of claim 1, further comprising:
in response to receiving the interaction by the first user through the portal page, displaying the first product as part of content dynamically presented in the portal page.

9. A non-transitory computer-readable storage medium coupled to one or more processors and having instructions stored thereon which, when executed by the one or more processors, cause the one or more processors to perform operations, the operations comprising:
collecting data for interactions performed by users through a portal page, the data comprising a plurality of sequences of interactions performed by a user on representations of products displayed in the portal page;
inputting the plurality of sequences of interactions to train a neural network on temporal dependencies between interactions within a sequence from the plurality of sequences;
processing the plurality of sequences by the neural network through a plurality of learning layers to generate a model for product identification, the plurality of sequences of interactions being defined to have a fixed equal length for a number of interactions within a sequence, the number corresponding to a sequence length value defined by the neural network; and
upon receiving an interaction by a first user at the portal page in relation to a product from the products and based on the model, identifying a first product from the products to be displayed in the portal page for the first user.

10. The computer-readable storage medium of claim 9, wherein the instructions to identify the first product from the products to be displayed in the portal page further comprise instructions which when executed by the one or more processors, cause the one or more processors to perform operations comprising:
  providing the interaction from the first user for performing machine learning prediction according to the model as provided by the neural network, the interaction comprising a sequence of actions performed in relation to one or more products from the products displayed in the portal page; and
  evaluating the sequence of actions corresponding to the interaction from the first user based on the model to determine the first product.

11. The computer-readable storage medium of claim 9, wherein interactions within a sequence from the plurality of sequences correspond to a single user from the users.

12. The computer-readable storage medium of claim 9, wherein the instructions to process the plurality of sequences by the neural network further comprise instructions which when executed by the one or more processors, cause the one or more processors to perform operations comprising:
  initializing an embedded layer to map product identifiers of the products from the portal page to product vector data, wherein the product vector data defines a number of products provided through the portal page, a dimension of the product vector data, and a length value of a sequence to be input to the neural network for training and generating the model for product identification; and
  generating the model for product identification, wherein the model comprises learning units as hidden layers for iteratively processing input comprising sequences from the plurality of sequences.

13. The computer-readable storage medium of claim 9, wherein the instructions to process the plurality of sequences by the neural network further comprise instructions which when executed by the one or more processors, cause the one or more processors to perform operations comprising:
  normalizing output generated from the learning units at an activation layer of the neural network, wherein the normalization is performed in a non-linear fashion to define a sum of output probabilities to amount to a value of 1,
  wherein the neural network is a recurrent neural network, and a subsequent layer of the model returns an accumulated output from previously processed layers, and
  wherein the neural network comprises a filtering layer that removes input provided for training the neural network according to a configured reduction factor.

14. The computer-readable storage medium of claim 9, further storing instructions which when executed by the one or more processors, cause the one or more processors to perform operations comprising:
  in response to receiving the interaction by the first user through the portal page, displaying the first product as part of content dynamically presented in the portal page.

15. A system, comprising:
  a computing device; and
  a computer-readable storage device coupled to the computing device and having instructions stored thereon which, when executed by the computing device, cause the computing device to perform operations, the operations comprising:
    collecting data for interactions performed by users through a portal page, the data comprising a plurality of sequences of interactions performed by a user on representations of products displayed in the portal page;
    inputting the plurality of sequences of interactions to train a neural network on temporal dependencies between interactions within a sequence from the plurality of sequences;
    processing the plurality of sequences by the neural network through a plurality of learning layers to generate a model for product identification, the plurality of sequences of interactions being defined to have a fixed equal length for a number of interactions within a sequence, the number corresponding to a sequence length value defined by the neural network; and
    upon receiving an interaction by a first user at the portal page in relation to a product from the products and based on the model, identifying a first product from the products to be displayed in the portal page for the first user.

16. The system of claim 15, wherein the instructions to identify the first product from the products to be displayed in the portal page comprises instructions which when executed by the computing device, cause the computing device to perform operations comprising:
  providing the interaction from the first user for performing machine learning prediction according to the model as provided by the neural network, the interaction comprising a sequence of actions performed in relation to one or more products from the products displayed in the portal page; and
  evaluating the sequence of actions corresponding to the interaction from the first user based on the model to determine the first product,
  and
  wherein interactions within a sequence from the plurality of sequences correspond to a single user from the users.

17. The system of claim 15, wherein the instructions to process the plurality of sequences by the neural network comprises instructions which when executed by the computing device, cause the computing device to perform operations comprising:
  initializing an embedded layer to map product identifiers of the products from the portal page to product vector data, wherein the product vector data defines a number of products provided through the portal page, a dimension of the product vector data, and a length value of a sequence to be input to the neural network for training and generating the model for product identification;
  generating the model for product identification, wherein the model comprises learning units as hidden layers for iteratively processing input comprising sequences from the plurality of sequences; and
  normalizing output generated from the learning units at an activation layer of the neural network, wherein the normalization is performed in a non-linear fashion to define a sum of output probabilities to amount to a value of 1,
  wherein the neural network is a recurrent neural network, and a subsequent layer of the model returns an accumulated output from previously processed layers, and
  wherein the neural network comprises a filtering layer that removes input provided for training the neural network according to a configured reduction factor.

18. The system of claim 15, wherein the computer-readable storage device includes further instructions which when executed by the computing device, cause the computing device to perform operations comprising:

in response to receiving the interaction by the first user through the portal page, displaying the first product as part of content dynamically presented in the portal page.

\* \* \* \* \*